United States Patent [19]

Cestaro et al.

[11] Patent Number: 4,655,589
[45] Date of Patent: Apr. 7, 1987

[54] APPARATUS FOR AUTOMATIC MEASUREMENT OF STRESS IN A TRANSPARENT BODY BY MEANS OF SCATTERED LIGHT

[75] Inventors: Massimo Cestaro; Ciro Paudice, both of Vasto, Italy

[73] Assignee: Societa Italiana Vetro-Siv-S.p.A., Chieti, Italy

[21] Appl. No.: 698,598

[22] Filed: Feb. 5, 1985

[30] Foreign Application Priority Data

Feb. 13, 1984 [IT] Italy ................................ 19582 A/84

[51] Int. Cl.$^4$ ......................... G01N 21/23; G01L 1/24
[52] U.S. Cl. ...................................... 356/35; 356/365; 356/367
[58] Field of Search ................... 356/33, 35, 364, 365, 356/366, 367

[56] References Cited

U.S. PATENT DOCUMENTS 3,811,775 5/1974 Abu-Saud ....................... 356/365 X
4,192,610 3/1980 Paraskevas ............................ 356/33

OTHER PUBLICATIONS

Mazurkiewicz et al., "Integrated-Plane Photoelastic Method Application of Photo Elastic Isodynes", *Eaptl. Mech.*, V. 19, No. 7, pp. 225-234, Jul. 1979.
Kishii, "Laser Biascope for Surface Stress Measurement of Tempered Glasses", *Opt. and Laser Tech.*, vol. 13, No. 5, pp. 261-264, Oct. 1981.

*Primary Examiner*—Davis L. Willis
*Assistant Examiner*—Matthew W. Koren
*Attorney, Agent, or Firm*—Wenderoth, Lind & Ponack

[57] ABSTRACT

An apparatus used directly on a flat sheet of transparent material, especially tempered glass, for simultaneous measurement of sign and amplitude of stress across the section of said glass sheet using scattered light. The apparatus allows reliable and repetitive measurements independently of the operator's subjective observations, since the data is read through an automatic system. The apparatus has a Helium-Neon (He-Ne) laser source of 1 to 5 mW, whose light beam is linearly polarized, then modulated with a series of wave plates (2,2', 2''), then passed through a collimator (3) and subsequently made to strike a prism (4) optically coupled with the glass sheet (V) being tested. Variation in intensity of the interference fringes is revealed by a TV camera (5) having a macrophotographic lens system (5') which focusses the scattered light on a solid-state array photodetector (5'). The photosensitive zone of the detector is positioned to detect intensity of the scattered light along path (BC) of the laser beam through the section of the glass sheet (V). An electronic circuit can thus convert the video signals transmitted by TV camera (5).

7 Claims, 6 Drawing Figures

APPARATUS FOR AUTOMATIC MEASUREMENT OF STRESS IN A TRANSPARENT BODY BY MEANS OF SCATTERED LIGHT

This invention relates to an apparatus for simultaneous measurement of both sign and amplitude of stress across the section of a flat sheet of transparent material, more especially glass, by means of scattered light.

Various types of apparatus for stress measurement using scattered light are already known in the art, but they are not able to provide the aforementioned results.

For example, U.S. Pat. No. 3,589,812 describes a method and device for measuring stress in a transparent body using non-polarized light; this light strikes a specimen immersed in an index liquid. The scattered light characteristics are read by means of an analyzer rotating at constant speed and by a photomultiplier.

Measurement consists in the interpretation of the electrical signal emitted by the photomultiplier through an electronic analog device. Hence data is purely qualitative.

French Pat. No. 2,097,473 describes a device for measuring stress in a transparent body.

This device uses scattered light; more precisely it causes a polarized light beam to strike a specimen immersed in an index liquid. The specimen is then rotated about its vertical axis in order to reveal the directions of the main stresses by assessing the intensity of the scattered light beam.

U.S. Pat. No. 3,970,285 also discloses a method and device for measuring stress in a specimen of transparent material using scattered light. Again, the specimen, immerser in an index liquid, is rotated about its vertical axis until the interference fringes are visible and until they reach maximum intensity. The type of interference fringe is then recorded to obtain quality data on the stress levels in the specimen.

German Pat. No. 1,473,380 discloses a method and device for measuring variation in sign of stress in the a tempered glass sheet by observing the direction of movement of the interference fringes generated by the incident light scattered by the glass sheet.

However, the stress curves are derived qualitatively only, and not quantitatively, with all the data depending on the observation skills of the operator.

The main objective of this invention is to provide a device for simultaneous measurement of the sign and amplitude of stress across the thickness of a tempered glass specimen.

A further object of the invention is to provide a quick and easy-to-use device capable of reading stress levels on the tempered glass sheet which can be of any shape or size; this is not to be found in other devices known in the art which, as has been disclosed above, must carry out the measurement on specimens of the finished product.

Hence a technical problem, hitherto not possible to tackle, has been solved. To is obvious that specimens cannot be cut from a sheet of tempered glass because any incision would destroy the stress equilibrium state and result in consequent fracture of the piece.

A further object of this invention is to provide an apparatus which, for the first time in history, is capable of carrying out reliable and repetitive measurements, because it is independent of the subjective assessment of an operator to interpret the type of interference fringe, its luminous intensity or amplitude of displacement of the interference fringes. This object has also been achieved because all readings, as will be described later on, are carried out by an automatic system designed for the purpose.

The apparatus in accordance with the invention, although especially devised for measurement of stress within the tempering stress range, is, however, also suitable for measuring residual stress in transparent untempered materials, provided that the structure inherent in the material has sufficient density of diffusion centers to permit a good level of diffusion of the light beam. Examples of materials with these properties are un-tempered glass, plexiglas and similar plastic materials.

In order to understand the importance of the invention and the progress accomplished by it, it is necessary to consider the technical problems involved. It is already known that stress in a glass product can cause an optical anisotropic effect (birefringence) which can be detected by polarized light. Intensity of scattered light from a glass element depends on the state of polarization of the impinging light on said glass element and on the optical activity of the light beam along its path through the section of glass. This intensity varies with the state of stress within the glass.

If an incident ray with angle $\gamma$ impinges on a tempered glass sheet, with $Z'$ denoting the axis perpendicular to the plane $(X'Y)$ in which the glass sheet lies, then:

$$T(Z') = \frac{1}{C} \frac{dR}{dZ'} \frac{1}{\tan\gamma \sin\gamma}$$

where:
T=stress (variable along axis $Z'$),
C=photoelastic constant of the material,
R=optical delay between the two refracted rays (ordinary and extraordinary),
$\gamma$=angle of incidence of the ray on the glass sheet.

In order to obtain data on the optical R, polarization of the light beam was modulated so that each diffusive element of the glass diffuses depending on the state of polarization of the incident light.

Through the detection of the intensity of light scattered by the glass sheet in consecutive situations, it is possible to plot the optical delay curve and then the stress distribution curve.

The apparatus in accordance with the invention makes use of this knowledge. The apparatus substantially comprises a laser light source whose polarized light beam is subsequently modulated by a set of wave plates.

The light beam travels through a collimator and strikes the face of a prism optically coupled to the glass sheet being tested.

Optical coupling is achieved by adding a liquid, of the same refractive index as the glass, between the prism and the glass sheet. Good results are achieved using the commercially available liquid Cargille HV 1248.

The shape of the prism is such so as to ensure suitable penetration of the light beam in the glass sheet being tested as well as detection of the interference fringes under a suitable angle of observation.

Measurement of a variation in intensity of the interference fringes is performed through a solid-state photodetector array (128 integrated photodiodes—already known in the art) after optical focussing. The electronic signal generated by said array is digitized, then processed by a microprocessor-based digital system. The result of processing permits determination of the phase and distribution curves of the stress in the glass sheet across its thickness, and therefore both compression and tensile stress.

The apparatus in accordance with the invention is by way of exemplification only, with no limitation to be inferred, in the accompanying drawings which represent a preferred embodiment of the invention.

Figure 1:
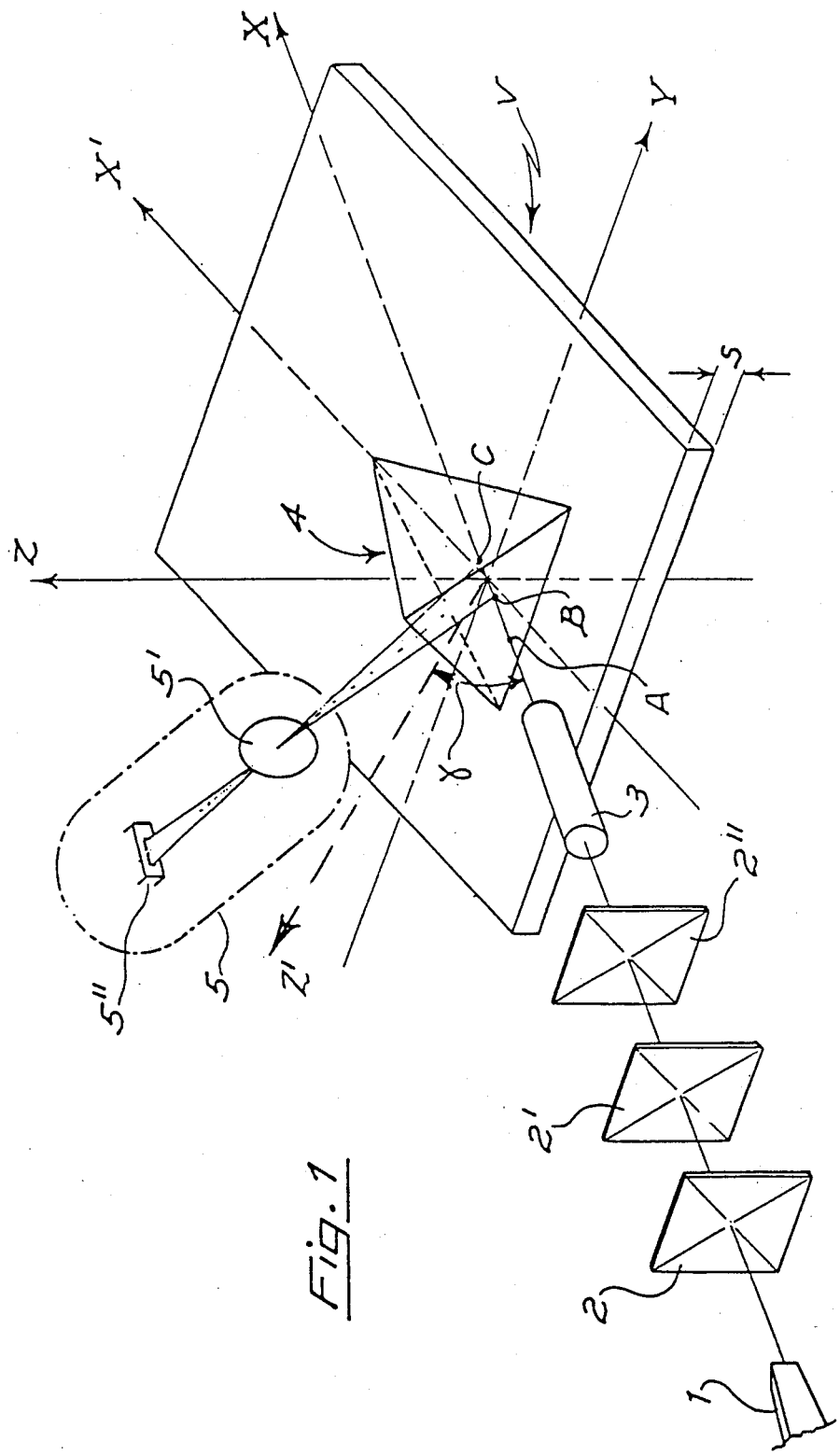
FIG. 1 is a diagrammatic assembly drawing of the apparatus in accordance with the invention.

As can be seen in the drawings a laser (1) (Helium-Neon) 1 to 5 mW in power, emits a ray along axis X, which is polarized linearly in the vertical plane ZX with said ray impinging a fixed quarter-wave plate (2) whose axes lie at ±45° to axis Z. After leaving plate (2), the ray strikes a second quarter-wave plate (2') capable of rotating about optical axis X. Initially plate (2') appears with axes lying 45° to axis Z, then 7 rotations, each of 22.5°, are performed so as to have a linearly polarized ray on eight different planes of polarization, each rotated by 45° with respect to the other.

The as-modulated ray then strikes a third fixed quarter-wave plate (2'') with axes lying at 45° to axis Z.

The ray is focussed by means of a collimator (3). The collimator (3) is designed to ensure a light ray with maximum diameter of 0.1 mm in the zone of observation, because the accuracy of the measurement of the distribution of stress over space is inversely proportional to the dimensions of the volume element on which the state of polarization is observed.

Therefore, in order to have a maximum diameter of 0.1 mm in the zone of observation (denoted by segment BC), a collimator was designed (FIG. 3) which supplies a theoretical minimum diameter of 40 to 60 μm.

The design of said collimator takes into account that a He-Ne laser generates a ray approx. 0.5 to 1 mm in diameter.

For example, suppose a light beam of 0.5 mm in diameter is generated, then $$f = \frac{D_o d}{1.3\lambda} = 25 \text{ mm}$$

where
 f=focal length of the lens
 $D_o$=light beam diameter (0.5 mm)
 λ=wave length (633 nm)

If a part of the optical path in the glass has a refractive index of =~1.5, then there will be an increase in distance of 35 mm at the most. This distance is unacceptable in the apparatus in accordance with the invention; in fact, the inlet prism dimensions and inclination of the glass sheet require a front distance lower than ~60 mm.

Hence a collimator should be used similar in structure to a Galilean telescope.

Unlike commercial collimators (Spectra-Physics, Metrologic etc.) designed to output a beam of parallel light rays, the apparatus in accordance with the invention requires focussing of the light rays at a distance L≧60 mm, with full correction of the aberrations.

Figure 3:
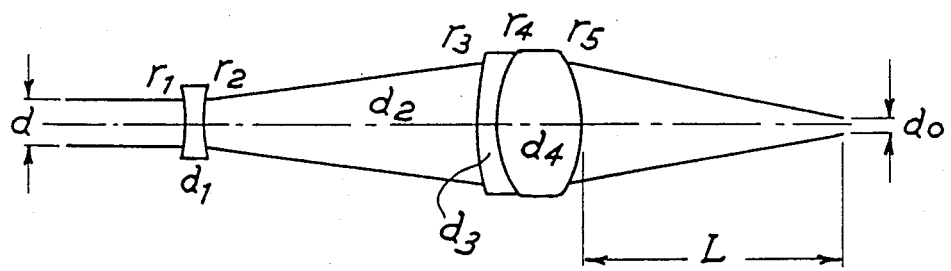
FIG. 3 illustrates the optical scheme of the collimator which focusses the light beam appropriately.

The above has been accomplished by increasing the diameter of the laser beam using a divergent lens following the optical scheme illustrated in FIG. 3, and whose design features are as follows:

| lens | ray (mm) | separation (mm) |
|------|----------|-----------------|
| 1st  | $r_1 = -30.5$ | $d_1 = 2.0$ |
|      | $r_2 = 30.5$  |             |
| 2nd  | $r_3 = 35.34$ | $d_2 = 65.0$ |
|      | $r_4 = 13.27$ | $d_3 = 2.0$ |
| 3rd  | $r_5 = -48.04$ | $d_4 = 4.0$ |

With this procedure it is possible to explore the zone of diffusion without the need for accurate focussing; moreover the beam undergoes less distorsion through a sheet of commercial glass (V) which does not posses a very high degree of optical homogeneity.

The collimated ray strikes point (A) normally on the face of a tetrahedral prism (4) optically coupled to the glass sheet (V) under investigation.

Said prism (4) does not interfere with the polarization of the light beam as the material chosen for the prism is free from internal stress.

On the opposite side of the glass sheet being tested, there is optically coupled a thin clear and unstressed glass member, glued, for example, with Canada balsam, to another glass member colored blue. This type of coupling prevents the laser beam from exiting and increases, by way of contrast, the brightness of the scattered beam.

The scattered beam is then collected by means of an optoelectronic detector system (5) mounted normally to the optical axis (X), with the axis of said system (S) forming an angle of 45° to the horizontal plane defined by axes (XY). This angle is known as the angle of observation of the diffused light. From now on, said system (S) will be called a "TV camera".

Furthermore, a value γ=45° to 70° was chosen for the angle of incidence of the collimated ray on the glass sheet (V), as this range permits satisfactory scattering of the light and therefore a good level of observation.

TV camera (5) consists of a macrophotographic objective (5') for focussing the scattered light onto a solid-state photodetector array (5'').

The photosensitive zone of the detector is positioned so as to measure the intensity of the scattered light along path (BC) of the laser beam through the section of glass sheet (V) being tested; in this way a spatial sampling of the intensity of scattered light is made.

Figure 1A:
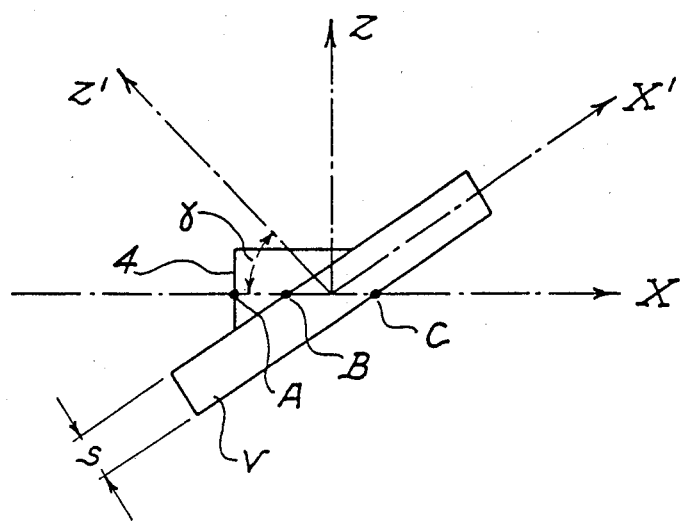
FIG. 1A is a reduced scale diagrammatic side view of FIG. 1.

Orientation and arrangement of axes (X, X', Z, Z') is graphically represented more clearly in FIG. 1A.

Figure 2:
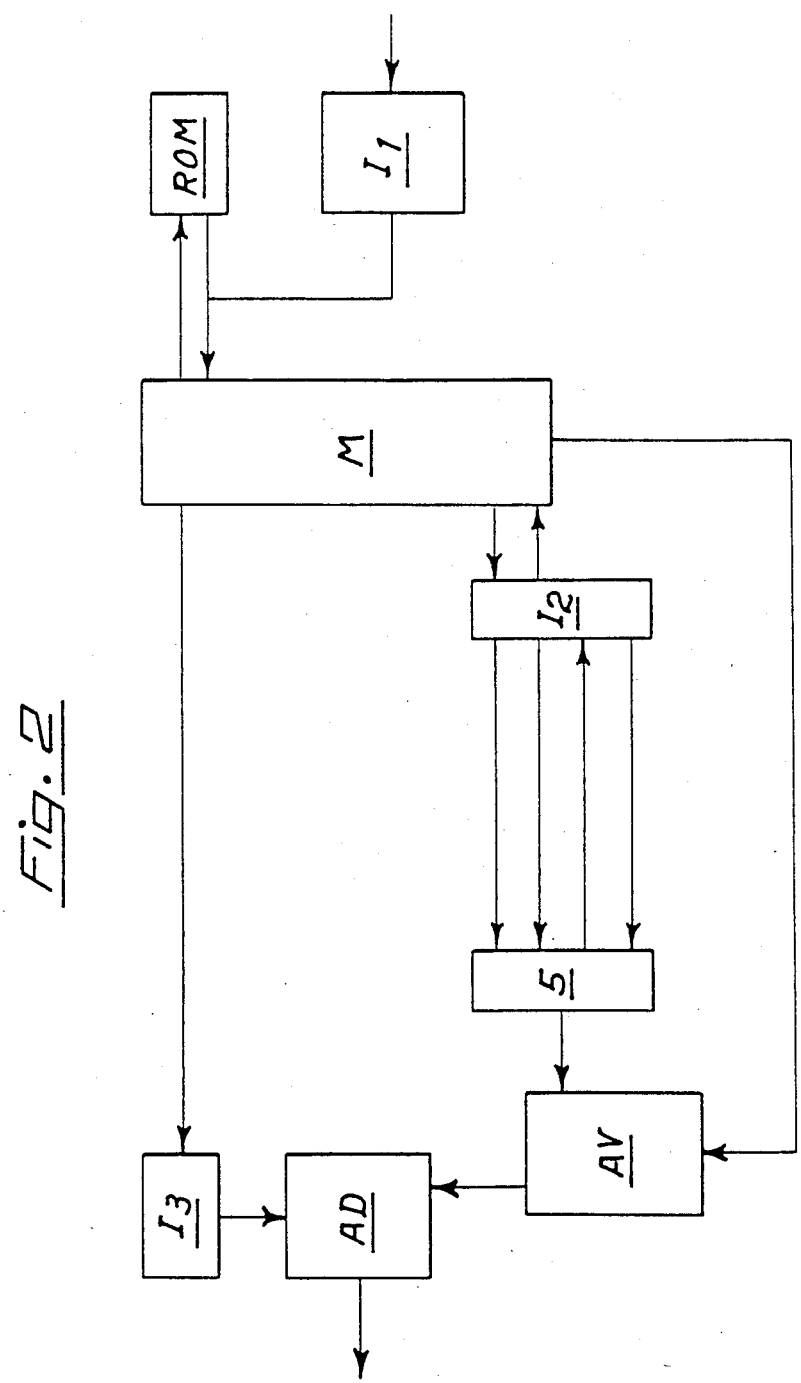
FIG. 2 is a block diagram of the electronic circuit transmitting the light-generated electric signal to a processor.

An electronic circuit (see FIG. 2) is also provided for converting the video signals transmitted from TV camera (5).

Said circuit is physically located in a P.C. whose main functions are to control both TV camera (5) and the dialogue with a central processor unit. Its most important feature is one of being able to measure and record light signals of very low intensity in the order of approx. 1 μW/cm².

The circuit operates as follows: a microprocessor (M) (FIG. 2) executes, after being sent a signal from the computer through interface ($I_1$), a program written in ROM (read only from memory), which consists of sending a control signal to video amplifier (AV) and other signals to the video-control system ($I_2$, $I_3$). These signals represent the PC board operational parameters. Interface ($I_2$) sends a clock signal and a reading start signal to TV camera (5); TV camera (5) replies by sending a video signal, obtained via the photodetector array, while the reconditioning signal for the photodetector is sent via the interface immediately after having received the end of reading the signal from said photodetector. The video signal is amplified by (AV) and proceeds to an analog/digital (AD) converter.

When the TV camera finishes sending the video signal corresponding to the pulse received, it sends an "end of read" signal to interface ($I_2$) and then waits for a new reading start pulse.

The analog-digital (AD) converter feeds the computer with the data received through interface ($I_3$).

Figure 4:
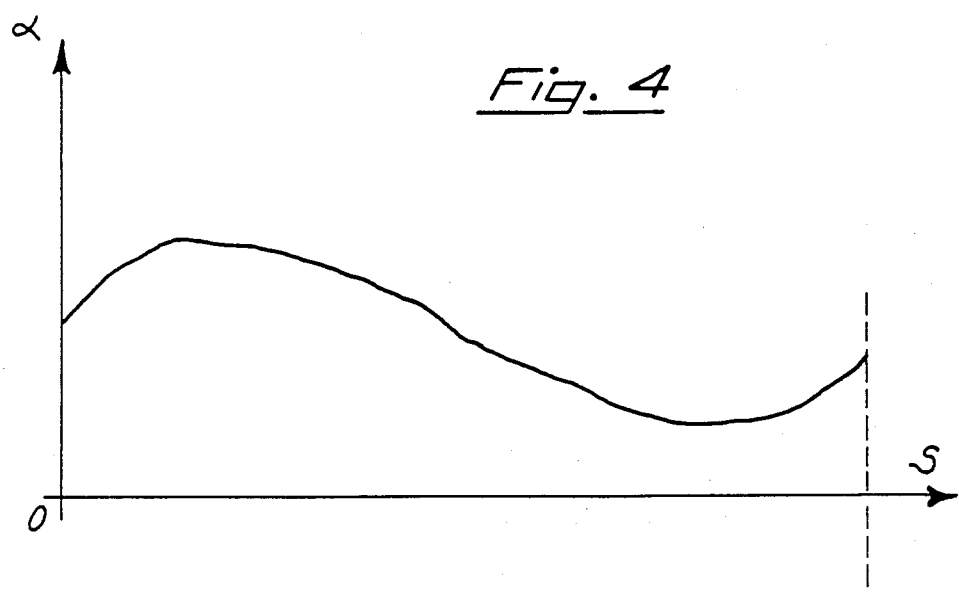
FIG. 4 shows the phase delay curve plotted from the results received from the computer.

The computer, programmed with suitable software, reads said signals, processes them and traces the phase delay curve (as represented in FIG. 4) with the section (S) of glass sheet (V) being plotted along the abscissa and phase angle ($\alpha$) along the ordinate.

The light signal read by the photodetector of TV camera (5) corresponds to a sequence of 128 samples whose value is:

$$Vi = Ai \sin(\omega + \alpha_i) \quad (i=1\ldots, 128)$$

where Ai is a constant depending on the efficiency of the individual photodiode, $\alpha_i$ is the phase delay on the i-th element in the section of glass sheet V, $\omega$ is the angle of rotation of the quarter-wave plate (2'). Measurement is characterized by the definition of eight planes of polarization and the reading of the relative sequences.

Phase $\alpha_i$ data are obtained by integrating eight samples with the same i-th index which form part of each of the eight sequences read in relation to the eight planes of polarization the following quantities are obtained respectively:

$$Ci = K \cos\alpha i \quad Si = K \sin\alpha i \text{ from which}$$

$$\alpha i = \arctan \frac{Si}{Ci}$$

The computer then proceeds to plot the phase delay angle ($\alpha$) in relation to the glass section thickness, while constant K does not influence the phase delay.

Figure 5:
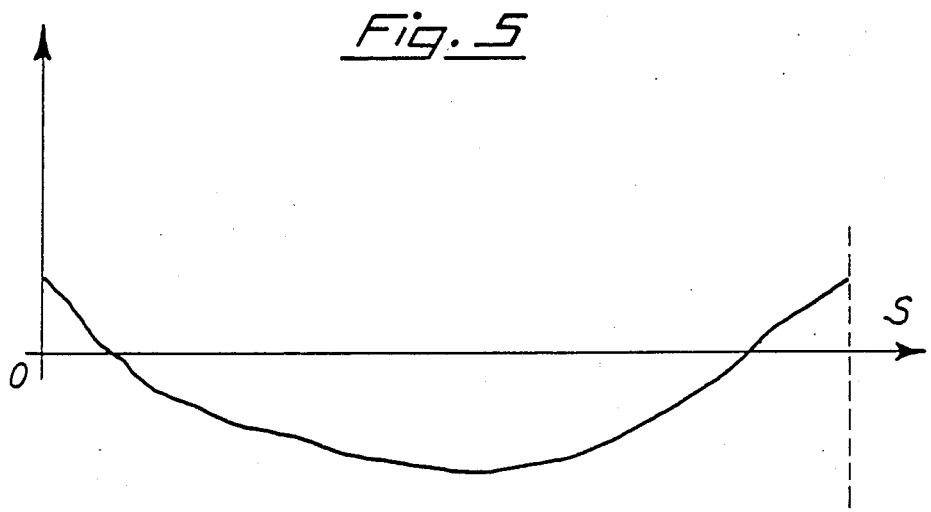
FIG. 5 shows the stress curve in the glass section derived from the curve in FIG. 4.

The computer, still through adequate software, derives from the phase delay curve, the stress (amplitude and sign) curve, with stress being measured across the glass sheet (V) section (FIG. 5).

What is claimed is:

1. An apparatus for determining and measuring the sign and amplitude of stress present in a glass sheet comprising:
   a laser for emitting a polarized light beam along an emitting axis towards the tempered glass sheet, the polarized light beam being polarized in a first plane of polarization;
   a first quarter-wave plate positioned between said laser and the tempered glass sheet and through which the light beam passes normally thereto, said first quarter-wave plate having axes intersecting said first plane of polarization at angles of 45° relative thereto;
   a second quarter-wave plate positioned between said first quarter-wave plate and the glass sheet and through which the light beam passing through said first quarter-wave plate passes normally thereto, said second quarter-wave plate having axes intersecting said first plane of polarization at angles of 45° relative thereto, said second quarter-wave plate being rotatable about the emitting axis at increments of 22.5° relative to said first plane of polarization for providing eight different planes of polarization, and means for rotating said second quarter-wave plate about the emitting axis;
   a third quarter-wave plate positioned between said second quarter-wave plate and the glass sheet and through which the light being passed through said second quarter-wave plate passes normally thereto to the tempered glass sheet and is scattered therethrough, said third quarter-wave plate having axes intersecting said first plane of polarization at angles of 45° relative thereto;
   an observation system adjacent the glass sheet for detecting the light scattered by the glass sheet and for producing video signals in response to the detection of the scattered light; and
   an electronic circuit operatively connected to said observation system for converting said video signals to data corresponding to the sign and amplitude of the stress across the glass sheet.

2. The apparatus as claimed in claim 1 wherein,
   said laser has a Helium-Neon source of 1-5 mW in power for emitting a polarized light having an initial diameter between 0.5 and 0.1 mm; and
   said apparatus further comprises a focusing means positioned between said third quarter-wave plate and the glass sheet for focusing the light passing through said third quarter-wave plate on said glass sheet by reducing said initial diameter of the light to a diameter between 40 and 60 $\mu$m between said focusing means and the glass sheet, said focusing means comprising a first lens, a second lens and a third lens between said a first and second lenses and said glass sheet, said third lens located at a distance of at least 60 mm from the glass sheet.

3. The apparatus as claimed in claim 2 wherein,
   said first lens is divergent for increasing the initial diameter of the light, and said second and third lenses are positioned for receiving the light of increasing diameter from said first lens and are configured for reducing the diameter of the light received to said diameter between 40 and 60 $\mu$m over said distance of at least 60 mm.

4. The apparatus as claimed in claim 1 wherein,
   said laser is positioned to face a face of the glass sheet for emitting said polarized light beam at an angle between 45° and 70° relative to the face of the glass sheet; and
   further comprising a tetrahedral prism optically coupled to said glass sheet and having a face normal to the direction in which said polarized light beam is emitted.

5. The apparatus as claimed in claim 4 wherein,
   said observation system comprises a TV camera adjacent the face of the glass sheet and located on an axis that intersects and is perpendicular to said emitting axis while being inclined at an angle of 45° relative to a horizontal plane passing through said emitting axis for detecting the light scattered by the glass sheet along the thickness of the glass sheet.

6. The apparatus as claimed in claim 5 wherein, said TV camera comprises a macrophotographic objective for focusing an image of the light scattered by the glass sheet and a curtin-light photodetector consisting of 128 photodiodes positioned adjacent said objective for receiving the focused image of the light scattered through the glass sheet from said objective.

7. The apparatus as claimed in claim 1 wherein, the video signals consist of luminous signals of very low intensity,
and said electronic circuit comprises means for measuring and recording said luminous signals of very low intensity in the order of approximately 1 $\mu W/cm^2$.

* * * * *